C. H. LAWSON.
HAY AND STOCK RACK IRON.
APPLICATION FILED JAN. 5, 1914. RENEWED APR. 26, 1918.
1,267,777.
Patented May 28, 1918.
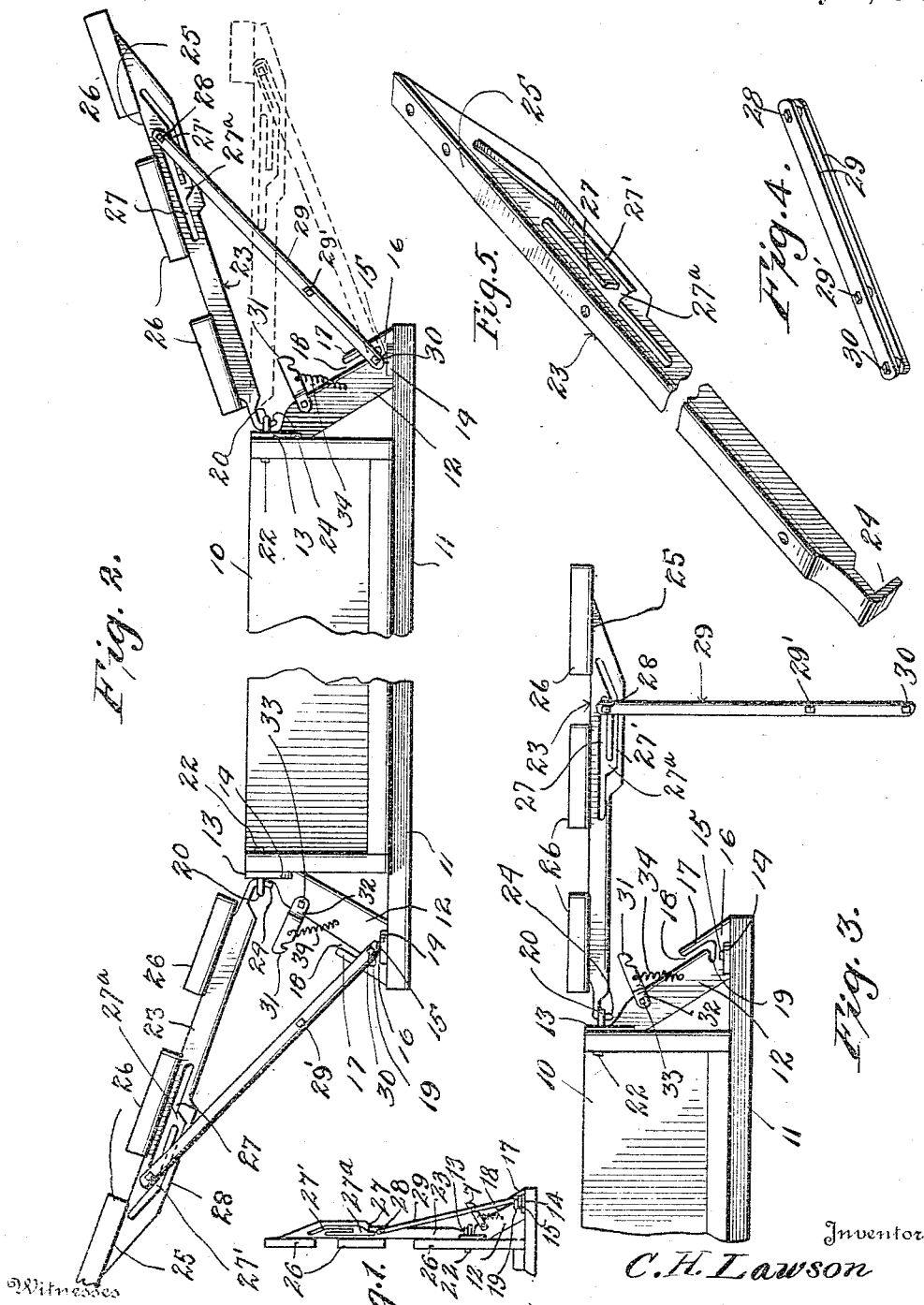
Inventor
C. H. Lawson

UNITED STATES PATENT OFFICE.

CLYDE H. LAWSON, OF AVOCA, MICHIGAN.

HAY AND STOCK RACK IRON.

1,267,777.  Specification of Letters Patent.  Patented May 28, 1918.

Application filed January 5, 1914, Serial No. 810,448. Renewed April 26, 1918. Serial No. 230,999.

*To all whom it may concern:*

Be it known that I, CLYDE H. LAWSON, a citizen of the United States, residing at Avoca, in the county of St. Clair, State of Michigan, have invented certain new and useful Improvements in Hay and Stock Rack Irons; and I do hereby declare the following to be a full, clear, and exact description of the invention, such as will enable others skilled in the art to which it appertains to make and use the same.

This invention relates to hay racks and like vehicles and has special reference to a combined hay and stock rack supporting iron or stake.

The principal object of the invention is to improve and simplify the general construction of devices of this character.

A second object of the invention is to provide an improved stake which may be readily detached from the wagon box but which, when in use, will securely support the slatted portion of the box in either the vertical position, for use as a stock rack, or in a slanting position for use as a hay rack.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and:—

Figure 1 is a fragmentary rear elevation of the device showing the same in position on a wagon and arranged for use as a stock rack.

Fig. 2 is a similar rear elevation on a slightly enlarged scale and showing the device in position for use as a hay rack.

Fig. 3 is a similar view but showing the device partly detached, the brace member being detached, and the other member ready for detaching.

Fig. 4 is a detail perspective view of one of the stake bars, and

Fig. 5 is a detail view of the stake proper removed from the other part.

In carrying out the objects of the invention there is shown in the present disclosure a wagon box 10 which is supported on the usual body bolsters 11, these bolsters being braced to the side of the wagon box. In the brace used in the present invention a special form is necessary and to this end this brace is provided with a body portion 12 which has at its upper end the ears 13 by means of which it may be secured to the box by suitable bolts as hereinafter described. At the lower end of the body 12 there are also ears 14 so that bolts 15 may be passed through these ears and through the respective bolster 11. The body 12 is provided at its lower end with an offset portion 16 and from the outer end of the offset portion extends a guard 17 so that a slot 18 is formed between the body and this guard, the latter being spaced from the body for this purpose. The lower end of the slot 18 is carried into the body 12 as at 19 and forms an offset portion in said slot.

In connection with the brace above mentioned there is provided a U-shaped clip 20 which has suitable openings extending through its legs and through these openings and the openings in the ears 13 extend the fastening bolts 22 which secure both the clips 20 and the upper end of the brace 12 through the side of the wagon body.

The stake proper consists of a piece of angle iron which is provided with a straight body portion or web 23 terminating at the bottom in a hook shaped portion 24, said portion being formed by cutting away one leg of the angle and bending the remaining leg as clearly indicated in Fig. 5. The top of this stake is flattened and bent as at 25 and secured to this flattened portion and one leg of the stake are the slotted side members 26 of the rack. In the remaining leg of the angle iron there is formed a slot 27 which is connected to a similar slot 27' extending farther toward the end of the bar 23 by a short transverse slot 27ᵃ. The slots 27 and 27' receive a pin 28 which passes through and connects the upper ends of a pair of bars 29 forming the brace for the stake. These bars 29 are furthermore held apart by suitable spacing portions on the pin 28 and by similar spacing portion on pins 29' and 30, the latter being at the lower end of the brace while the pin 29' is intermediate the ends. The pin 30, when the device is in use as a stake, fits in the slot 18 or its extension 19. Pivoted to the body 12 of the wagon brace is a catch 31 which is provided with a fork end 32 which straddles the body 12 so that a suitable pin 33 may be passed through the fork end and through the body 12 to pivotally connect said catch to the wagon body brace 12. This catch 31 is so arranged that when the parts are in the position shown in Fig. 1 the hook of the catch will engage the pin 29' and thus hold the brace in position with the upper end end inclined inward toward the wagon so that the stakes 23 are held vertically. This catch is furthermore kept in engagement but permitted to be released by suitable means, as for instance by means of the spring 34 which is connected at one end to said catch and at the other end to the body 12 of the wagon body brace.

When the device is intended to be used as a hay rack this catch is disengaged from the pin 29' so that the parts assume the position shown in Fig. 2, the pin 28 sliding up into the upper end of the slot 27 where it is stopped by the end of said slot. At this time the pin 30 drops into the extension 19 and is very securely held. When it is desired to use the device as a flat rack the pins 28 are moved into the slots 27' whereupon the device assumes the position shown in dotted lines in Fig. 2. The positions of the parts are such that, when in position as in Fig. 2, the stake 23 will be inclined upwardly as clearly shown in said figure. When it is desired to detach the rack from the wagon body it is simply necessary to unhook the latch 31 and raise the lower end of the brace member 29 so that the pin 30 passes out of the slot 18. Then the rack may be dropped down into a horizontal position whereupon the hook end 24 of the stake may be disengaged from the member 20. It will thus be seen that the rack may be quickly applied or removed from the wagon without the use of any bolts or screws or any like adjustment and that when so applied the rack will be firm and strong in either position.

There has thus been provided a simple and efficient device of the kind described and of the character specified.

It will be obvious that many minor changes may be made in the form and construction of this invention without departing from the material principles thereof. It is not therefore desired to confine the invention to the exact form herein shown and described, but it is wished to include all such as come properly within the scope claimed.

Having thus described the invention, what is claimed as new, is:—

1. The combination with a wagon body having a side section hingedly connected thereto, of a brace having a substantially vertically disposed slot open at its upper end and an extension of said slot disposed horizontally and closed at its inner end, a stake secured to extend transversely of said side section, the said stake comprising a web having a pair of parallel spaced slots extending longitudinally thereof, one of said slots communicating at one end with the medial portion of the other of said slots and extending beyond the same and angularly inwardly at its opposite end, a bar having pins at each end for engagement within the slots of said brace and web respectively, and means for holding said bar with its pins at the outermost extremity of said horizontally disposed slot extension and at the lower extremity of the innermost of said parallel slots, substantially as described.

2. The combination with a wagon body having a side section hingedly connected thereto, of a brace having a substantially vertically disposed slot open at its upper end and an extension of said slot disposed horizontally and closed at its opposite end, a stake secured to extend transversely of said side section, the said stake comprising a web having a pair of spaced parallel slots extending longitudinally thereof, the outermost of said slots communicating with the medial portion of the adjacent slot through an inwardly and angularly inclined slot and extending at its outer end beyond the said adjacent slot and being inclined inwardly, a stake brace comprising a pair of spaced bars, pins connecting the ends of said bars, one of said pins extending through said web slots and the other of said pins being adapted for engagement within said brace slot, and the said pins being spaced apart on said bars a distance equal to the distance between the outermost extremity of said horizontal extension of the brace slot and the lower extremity of the innermost of said web slots when the said stake is vertical, substantially as described.

In testimony whereof, I affix my signature, in the presence of two witnesses.

CLYDE H. LAWSON.

Witnesses:
F. A. HILL,
H. K. BRINKMAN.